Nov. 17, 1931.  B. J. GEORGIAS  1,832,114
PRESSURE CONTROLLING DEVICE FOR PNEUMATIC TIRES
Filed Oct. 23, 1930
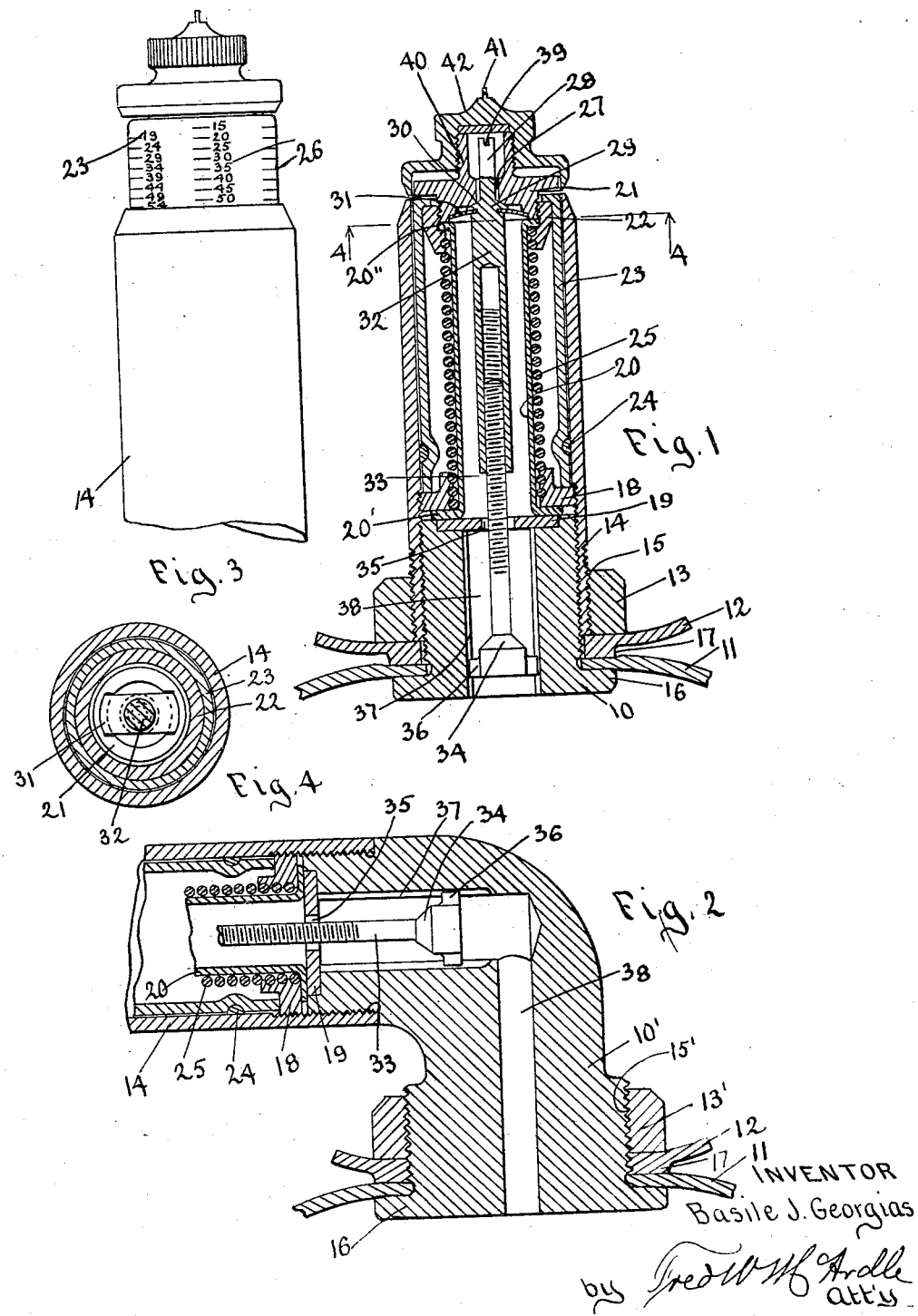

Patented Nov. 17, 1931

1,832,114

UNITED STATES PATENT OFFICE

BASILE J. GEORGIAS, OF BOSTON, MASSACHUSETTS

PRESSURE CONTROLLING DEVICE FOR PNEUMATIC TIRES

Application filed October 23, 1930. Serial No. 490,701.

My invention relates to pressure controlling devices for pneumatic tires, and particularly to the class in which excess inflation pressure is prevented by the operation of a closure valve when a predetermined pressure in the tire is attained.

One object of my invention is to provide a device of this kind which may be adjusted to inflate to any pressure within a predetermined maximum and to limit the pressure according to the adjustment.

Another object is to provide a device of this character, which will indicate underinflation pressure by casual observation.

Another object is to provide a device of this nature of economical construction, which may be substituted for the type of inflation valve now in common use.

My invention consists in the novel combination of elements to form a reliable device, adapted to combine the essential features of an inflation valve and a closure valve to limit inflation pressure, the device being adjustable to different inflation pressures.

It is now common practice to inflate the pneumatic tube of an automobile tire, applying a gauge from time to time to ascertain the inflation pressure, adding to or relieving the pressure according to the requirements. With the usual type of inflation valve when the tires are inflated to the required pressure, there is no means for indicating the lowering of pressure due to leakage or contraction, other than to apply a pressure gauge by hand. This is seldom done in practice, and often the pressure drops below the normal with accumulated detrimental effect on the tire, many motorists judging the degree of inflation by eye rather than by gauging.

My invention not only limits excessive inflation pressure but any drop in pressure may be detected at a glance by the careful motorist, and normal pressure may be restored at once. It is common practice for the motorist to test his tires weekly, and unless the drop in pressure is such as to detrimentally affect the shoe, little attention is paid to the inflation pressures between such tests. It thus frequently occurs that for one cause or another, the pressure in a tire is lowered to the danger point without being noticed.

With the visible pressure gauge forming a part of my device, this danger is reduced to a minimum.

Further advantages and novelties will appear in the accompanying specification and claim and the drawings forming a part thereof.

In the accompanying specification and claim and the drawings forming a part thereof I have described and illustrated a preferred form of my invention together with a modified form adapted to some types of wheel.

In the drawings,

Fig. 1 is an enlarged sectional elevation showing my valve in connection with a fragment of air tube.

Fig. 2 is a fragment showing a sectional modification, adapted for use with a disk wheel.

Fig. 3 is an elevation of a portion showing the indicator forming a part of my invention.

Fig. 4 is a sectional view on line 4—4, Fig 1, looking in the direction of the arrows.

Referring to the drawings, the nipple 10 projects from the air tube 11 and is secured to the tube in the usual manner by the guard 12 and the clamp nut 13.

The nipple 10 is threaded externally and the shell 14 is correspondingly threaded internally to engage therewith.

The shell is externally threaded at 15 and the nut 13 is correspondingly threaded to engage therewith, to clamp the air tube 11 between the flange 16 of the nipple and the boss 17 formed on the guard 12. The internal thread in the shell 14 is extended to permit engagement therewith of the flanged hub 18 correspondingly threaded and adapted to serve as a clamp nut.

The nipple 10 is counterbored to receive a washer 19 the purpose of which will be presently explained.

A rubber tube 20 is clamped at one end between the washer 19 and the face of the hub 18, and extends upwardly to be similarly clamped by the gland 21 threaded into the socket 22, I prefer to form this tube with reinforced flanged ends at 20' 20" in order that the clamping members may bear on a portion relatively thicker than the body of the tube 20, the walls of which may thus be expanded and extended within elastic limits without weakening at the clamping surfaces.

The socket 22 is revolubly secured in one end of the sleeve 23, slidable and rotatable in the shell 14, the packing ring 24 being provided to insure sliding contact between the sleeve 23 and the shell 14.

The sleeve 23, socket 22 and gland 21 thus form a chambered piston slidable axially within the shell 14, the sleeve being rotatable relative to the socket 22 and gland 21 for reasons to be presently explained. Secured in the hub 18 at one end and in the socket 22 at the other end and surrounding the tube 20, is the helical spring 25.

This spring is calibrated to agree with the predetermined pressure limits and also serves as a reinforcement for the tube 20 when air pressure is applied, and the tube is expanded and extended as will be shown.

The sleeve 23 normally extends from the end of the shell 14 to engage the hub 18 and the spring 25, connecting the socket 22 and the hub 18 is under sufficient tension to retain the sleeve 23 in such relation, until there is a predetermined minimum pressure applied by the usual air pump, at which time the sleeve 23 is moved axially against the yielding resistance of the spring and the pressure is indicated by the markings 26 on the exterior as related to the end of the shell 14 as shown in Fig. 2.

These markings I prefer to arrange to indicate variations in pounds, in five axial series varying in each marking by five pounds and successive series of markings varying by one pound.

As the sleeve is rotatable relative to the socket, and gland, the tube 23 and the spring 25, any series of markings may be rotated to secure a direct reading.

Extending through the gland 21 is a passage 27 through which passes the stem 28 of a conical valve 29 normally seated at 30 in the lower end of the gland, by the flat spring 31 operatively secured in a recess formed in the gland.

This valve is formed with an axial extension 32, tapped to receive a stem 33 correspondingly threaded and formed on its lower end with a conical valve 34. Extending through the washer 19, is the opening 35, and the stem 33 passes through this opening leaving an annular opening thereabout.

The valve 34 is provided with suitable means for preventing rotation, here shown by wings 36 engaging recesses 37 in the wall of the conduit 38, extending through the nipple 10 and permitting free passage of air into the tube 11 until such time as the pressure, acting through the tube 20 on the chambered piston of which the shell 23 is a part operates to extend the spring 25 and force the piston axially until the valve 34 seats in the opening 35 in the washer 19, preventing further inflation of the tube 11.

Further air supply through the nipple 40 operates to separate the seat 30 from the valve 29 against the yielding resistance of the spring 31, without permitting passage beyond the washer 19, sealed by the valve 34. The inflation of the tube 11 is thus limited to accord with the adjustable distance between the valves 29 and 34.

The axial relation of these valves may be changed by suitable means to accord with the required inflation pressure required and I have shown a slot 39 in the valve stem 28 adapted to be engaged by any suitable means, here shown by a projection 41 from the protection cap 42, and the valve 29 and extension 32 turned to lengthen or shorten the axial distance between the valves 29 and 34, thus governing the distance through which the spring 25 may be extended and the consequent pressure applied thereto.

In Fig. 2 the essential features of my device are shown in connection with an angle element 10' which is substituted for the nipple 10.

This may be secured in the air tube in any suitable manner, one means being shown in which the angle element 10' is formed with a threaded exterior at 15' of sufficient diameter to permit the use of a nut 13' which may be slipped over the angle, the clamping means being similar to those already described.

Having thus described my invention, I claim:

In a pressure controlling device, including a shell communicating with the interior of the tire through a constricted opening, a diaphragm member axially slidable in said shell and having a passage through which air may pass, a tension spring secured at one end to the diaphragm member and at its other end in fixed relation to the shell and adapted to be extended under pressure admitted through the aforesaid passage, a check valve adapted to seat in the diaphragm member to close the passage, a closure valve adapted to seat in the constricted opening to the tire, in combination therewith, an axial extension from one valve having a threaded portion; an axial extension from the other valve formed with a correspondingly threaded socket, and cooperative with the threaded extension; and means for rotating one valve relative to the other, for the purpose of varying adjustably their axial relation for the purpose described.

BASILE J. GEORGIAS.